United States Patent Office 3,712,932
Patented Jan. 23, 1973

3,712,932
POLYSULPHONE COMPOSITIONS
Maurice Balme, Saint-foy-les-Lyon, and Max Gruffaz, La Mulatiere, France, assignors to Rhone-Poulenc S.A., Paris, France
No Drawing. Filed Aug. 18, 1971, Ser. No. 172,939
Claims priority, application France, Aug. 21, 1970, 7030755
Int. Cl. C98g 41/04
U.S. Cl. 260—857 PI    16 Claims

ABSTRACT OF THE DISCLOSURE

A film-forming composition having good heat stability which comprises (a) a polysulphone and (b) an imide prepolymer obtained by reacting an N,N'-bis-imide of an unsaturated dicarboxylic acid of general formula:

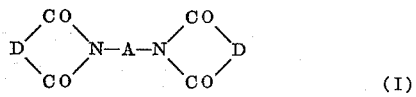
(I)

in which D represents a divalent organic radical containing a carbon-carbon double bond and A represents a divalent organic radical possessing at least two carbon atoms, with a di-primary diamine of general formula:

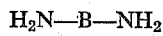

in which B represents a divalent organic radical possessing not more than 30 carbon atoms, the quantities of bis-imide and of diamine being such that the ratio $$\frac{\text{number of mols of N,N'-bis-imide}}{\text{number of mols of diamine}}$$

is between 1.1 and 50.

---

The present invention relates to compositions based on polysulphones and on prepolymers with imide groups.

French Pat. No. 1,555,564 discloses thermosetting resins obtained by reacting an N,N'-bis-imide of an unsaturated dicarboxylic acid, of general formula:

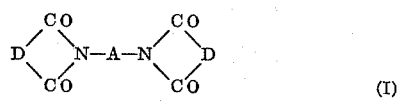
(I)

in which D represents a divalent radical containing a carbon-carbon double bond and A represents a divalent radical possessing at least two carbon atoms, with a di-primary diamine of general formula:

(II)

in which B represents a divalent radical which does not possess more than 30 carbon atoms. The amounts of N,N'-bis-imide and of diamine are so chosen that the ratio $$\frac{\text{number of mols of bis-imide (I)}}{\text{number of mols of diamine (II)}}$$

is at least 1; additionally, it is generally preferred that it should be less than 50. Heat-resistant resins are obtained which are remarkably resistant to severe heat exposure. This specification also indicates that the preparation of these resins can be effected in bulk, by heating the previously intimately mixed reagents, or in an inert polar diluent such as dimethylformamide, N-methyl-pyrrolidone and dimethylacetamide, the latter process being used where, for example, the desired application of the polymer formed requires the use of a solution.

The specification also indicates that for numerous uses it is advantageous to carry out the process in two stages; in a first stage, a prepolymer is prepared by heating the intimate mixture of the two reagents to a temperature of the order of 100 to 250° C. The prepolymer obtained can be used in the form of a solution, a suspension or a powder or can furthermore be shaped by simple hot casting. In a second stage, the prepolymer is cured by heating to temperatures of the order of 350° C., under pressure if required.

It is also known that polysulphones are thermoplastic polymers possessing valuable properties; in particular they have the ability to form fibers and films of relatively high softening point, possessing good resistance to chemical agents and to dielectric stresses. These polymers also have good resistance to oxidation but their mechanical properties decline substantially under the influence of heat. This is a serious disadvantage if the polymer is to be used in a composition which is to be subjected while hot to severe mechanical stresses. The aim of the present invention is to provide materials based on polysulphones which reduce or eliminate this disadvantage.

According to the present invention there is provided a film-forming composition which comprises (a) a polysulphone and (b) a prepolymer with imide groups, obtained by reacting an N,N'-bis-imide of an unsaturated dicarboxylic acid of general formula:

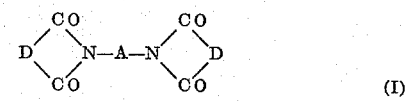
(I)

in which D represents a divalent organic radical containing a carbon-carbon double bond and A represents a divalent organic radical possessing at least two carbon atoms, and a di-primary diamine of general formula:

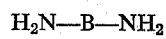

in which B represents a divalent organic radical possessing not more than 30 carbon atoms, the quantities of bis-imide and of diamine being such that the ratio $$\frac{\text{number of mols of N,N'-bis-imide}}{\text{number of mols of diamine}}$$

is between 1.1 and 50.

The symbol D is derived from an anhydride of a dicarboxylic ethylenically unsaturated acid of general formula:

(III)

such as maleic anhydride, citraconic anhydride, itaconic anhydride, pyrocinchonic anhydride and dichloromaleic anhydride, as well as the Diels-Alder reaction products of one of these anhydrides with an acyclic, alicyclic or heterocyclic diene. As regards the anhydrides obtained from dienes reference may be made to for example, volume IV of "Organic Reactions" (John Wiley and Sons, Inc.).

The symbols A and B may be identical or different and may represent a linear or branched alkylene radical with less than 13 carbon atoms, a phenylene or cyclohexylene radical, or a radical of formula:

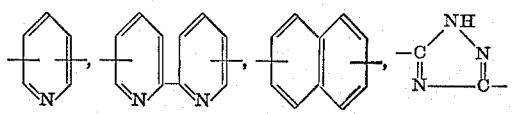

or

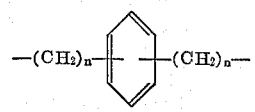

wherein $n$ represents an integer from 1 to 3. The symbols A and B can also comprise several phenylene or cyclohexylene radicals bonded to one another by a simple valency bond or by an inert atom or group such as —O—, —S—, an alkylene group with 1 to 3 carbon atoms,

—CO—, —SO$_2$—, —NR$_1$—, —N=N—, —CONH—
—COO—, —P(O)R$_1$—, —CONH—X—NHCO—

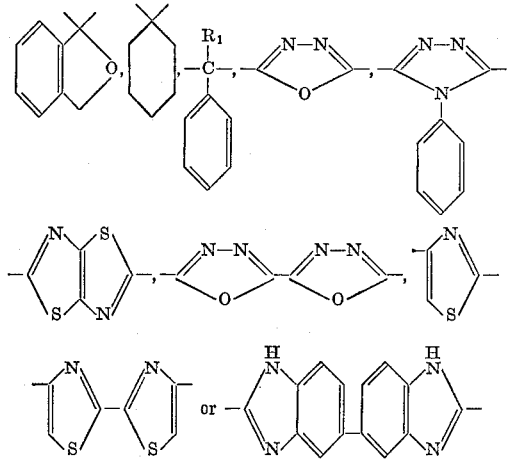

wherein R$_1$ represents a hydrogen atom, an alkyl radical with 1 to 4 carbon atoms, or a phenyl or cyclohexyl radical, and X represents an alkylene radical with less than 13 carbon atoms. The various phenylene or cyclohexylene radicals may be substituted by methyl groups, for example.

Specific examples of bis-imides which may be used include:

N,N'-ethylene-bis-maleimide,
N,N'-hexamethylene-bis-maleimide,
N,N'-meta-phenylene-bis-maleimide,
N,N'-para-phenylene-bis-maleimide,
N,N'-4,4'-diphenylmethane-bis-maleimide,
N,N'-4,4'-diphenylether-bis-maleimide,
N,N'-4,4'-diphenylsulphone-bis-maleimide,
N,N'-4,4'-dicyclohexylmethane-bis-maleimide,
N,N'-α,α'-4,4'-dimethylenecyclohexane-bis-maleimide,
N,N'-meta-xylylene-bis-maleimide,
N,N'-para-xylylene-bis-maleimide,
N,N'-4,4'-diphenylcyclohexane-bis-maleimide,
N,N'-meta-phenylene-bis-tetrahydrophthalimide,
N,N'-4,4'-diphenylmethane-bis-citraconimide,
N,N'-4,4'-diphenyl-1,1-propane-bis-maleimide,
N,N'-4,4'-triphenyl-1,1,1-ethane-bis-maleimide,
N,N'-4,4'-triphenylmethane-bis-maleimide and
N,N'-3,5-triazole-1,2,4-bis-maleimide.

Such bis-imides can be prepared following the method described in U.S. Pat. No. 2,444,536 for the preparation of N-aryl-maleimides.

Suitable diamines which can be used in the preparation of prepolymer (b) include:

4,4'-diamino-dicyclohexylmethane,
1,4-diamino-cyclohexane,
2,6-diamino-pyridine,
meta-phenylenediamine,
para-phenylene-diamine,
4,4'-diamino-diphenylmethane,
2,2-bis(4-aminophenyl)propane,
benzidine,
4,4'-diaminophenyl ether,
4,4'-diaminophenyl sulphide,
4,4'-diamino-diphenylsulphone,
bis(4-aminophenyl)methylphosphine oxide,
bis(4-aminophenyl)phenylphosphine oxide,
bis(4-aminophenyl)methylamine,
1,5-diamino-naphthalene,
meta-xylenediamine,
para-xylylenediamine,
1,1-bis(para-aminophenyl)-phthalene,
hexamethylenediamine,
6,6-diamino-2,2'-dipyridyl,
4,4'-diamino-benzophenone,
4,4'-diamino-azobenzene,
bis(4-aminophenyl)-phenylmethane,
1,1-bis(4-aminophenyl)cyclohexane,
1,1-bis(4-amino-3-methyl-phenyl)cyclohexane,
2,5-bis(m-aminophenyl)-1,3,4-oxadiazole,
2,5-bis(p-aminophenyl)-1,3,4-oxadiazole,
2,5-bis(m-aminophenyl)-thiazolo(4,5-d)thiazole,
5,5'-di(m-aminophenyl)-(2,2')-bis(1,3,4-oxadiazolyl),
4,4'-bis-(p-aminophenyl)-2,2'-dithiazole,
m-bis[(4-p-aminophenyl)-thiazolyl-2]benzene,
2,2'-bis(m-aminophenyl)-5,5'-dibenzimidazole,
4,4'-diamino-benzanilide,
phenyl 4,4'-diaminobenzoate,
N,N'-bis(4-aminobenzoyl)-p-phenylenediamine,
3,5-bis(m-aminophenyl)-4-phenyl-1,2,4-triazole,
N,N'-bis(p-aminobenzoyl)-4,4'-diamino-diphenyl-methane,
bis-p-(4-amino-phenoxycarbonyl)benzene,
bis-p-(4-amino-phenoxy)benzene,
3,5-diamino-1,2,4-triazole and
1,1-bis(4-aminophenyl)-1-phenyl-ethane.

The prepolymer (b) can suitably be prepared by heating the bis-imide and diamine, which have optionally beforehand been intimately mixed, at between 50° C. and 250° C. The process can be carried out in bulk or in a polar solvent such as cresol, dimethylformamide, N-methylpyrrolidone, dimethylacetamide or chlorobenzene. The prepolymers which are preferably employed are those of melting point between 50 and 150° C. To obtain these, it generally suffices to heat the bis-imide and the diamine at between 50° and 180° C. for from several minutes to several hours; the shorter the time the higher is the temperature employed. The relative amounts are preferably so chosen that the ratio:

$$\frac{\text{number of mols of bis-imide}}{\text{number of mols of diamine}}$$

is between 1.2 and 5. The preparation can be carried out in the presence of a strong acid catalyst. By "strong acids" as used herein are meant monoacids and polyacids in the Brönsted sense, of which at least one of the groups has an ionisation constant pKa of less than 4.5. Typical acids include inorganic acids such as hydrochloric, sulphuric, nitric or phosphoric acid, optionally substituted by an organic radical, particularly as regards sulphonic and phosphonic acids. The acids can also be carboxylic acids which may be simple ones or possess groups which do not interfere with the reaction between the bis-imide (I) and the diamine (II). Maleic acid is the preferred acid. 0.5 to 5% by weight of acid relative to the weight of the bis-imide (I) employed are generally used.

The polysulphones which can be used are linear polymers the macromolecular chains of which consist of optionally substituted divalent hydrocarbon radicals combined with —SO$_2$— radicals and, where appropriate, inert divalent atoms or radicals such as —O—, —S— or —CO—. Suitable polysulphones include aliphatic polysulphones such as the polybutadienesulphones described in U.S. Pat. No. 3,329,660, and alicyclic polysulphones such as those derived from 1,5-cyclooctadiene (U.S. Pats. Nos. 3,133,903, 3,313,785 and 3,317,490) or from cis,trans - 1,5 - cyclodecandiene (French Patent No. 1,469,063).

In the compositions of this invention, the polysulphones in which the hydrocarbon radicals are essentially aromatic in nature are preferably used, such as those described in French Patents Nos. 1,407,301 and 1,453,031 as well as in U.S. Pat. No. 3,321,449.

The imide prepolymer generally represents from 5 to 40% by weight of polysulphone used.

The compositions according to the invention may be prepared by intimately mixing the constituents. One embodiment of the process involves dissolving the polysulphone and the prepolymer with imide groups in an appropriate solvent. Preferably, polar solvents such as dichloroethane, dimethylformamide, N-methylpyrrolidone, dimethylacetamide and dimethylsulphoxide are used. According to a particular embodiment, the prepolymer is prepared in a solution of polysulphone by heating a mixture of bis-imide (I) and of diamine (II) in this solution under the temperature conditions set out above, so as to obtain the prepolymer.

The compositions of this invention are particularly suitable for the preparation of films and fibres. They can also be used for the preparation of coatings, adhesives and laminated materials, the base material of which may be inorganic, vegetable or synthetic fibres.

The following example further illustrates the present invention.

EXAMPLE (1) Preparation of the prepolymer with imide groups 537.6 g. of N,N'-4,4'-diphenylmethane-bis-maleimide and 3.3 g. of maleic acid were dissolved in 440 g. of dimethylformamide previously heated to 85° C. The solution was then heated to 115° C. and 118.8 g. of 4,4'-diamino-diphenylmethane added thereto; the final mixture was kept at 115° C. for a further 15 minutes.

A part of the solution ($S_1$) of prepolymer thus obtained was poured into water and the precipitate formed was filtered off; it was washed with water and then dried in vacuo at 50° C. A prepolymer which softens at 85° C. was thus isolated.

(2) Preparation of a composition in solution 30 g. of polysulphone consisting of a plurality of units of formula:

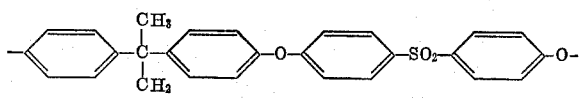

were dissolved in 170 g. of dimethylformamide to give a solution $S_2$. This polysulphone had a melt index (ASTM Standard Specification D 1238) of 0.7 g./mn.

1.5 g. of the solution $S_1$ were added to 24 g. of this solution $S_2$, whilst stirring; a solution $S_3$ was thus obtained.

(a) A part of the solution was cast on a glass plate so as to form a uniform layer of thickness 0.5 mn. The whole was heated under ventilated conditions at 130° C. for 1 hour and then at 180° C. for 24 hours. After cooling, the film was detached from its support; it displayed the following mechanical properties:

|  | At 25° C. | At 100° C. |
| --- | --- | --- |
| Tensile strength (kg./cm.$^2$) | 570 | 480 |
| Elongation, percent | 3.8 | 3.2 |

(b) A glass plate was coated with a further part of the solution $S_3$ in the manner indicated above and the whole was heated in a ventilated chamber at 130° C. for 1½ hours and then at 200° C. for 70 hours. The film thus obtained displayed the following mechanical properties:

|  | At 25° C. | At 150° C. |
| --- | --- | --- |
| Tensile strength (kg./cm.$^2$) | 700 | 310 |
| Elongation | 5 | 3.6 |

By way of comparison, a film was prepared in the same manner from the polysulphone solution $S_2$ and subjected to the same heat treatment; it has a tensile strength of 150 kg./cm.$^2$ at 150° C.

We claim:
1. A film-forming composition which comprises (a) a polysulphone and (b) an imide prepolymer obtained by reacting an N,N'-bis-imide of an unsaturated dicarboxylic acid of general formula:

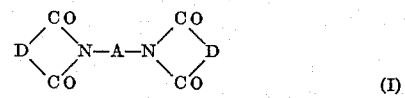

in which D represents a divalent organic radical containing a carbon-carbon double bond and A represents a divalent organic radical possessing at least two carbon atoms, with a di-primary diamine of general formula:

$$H_2N-B-NH_2$$

in which B represents a divalent organic radical possessing not more than 30 carbon atoms, the quantities of bis-imide and of diamine being such that the ratio $$\frac{\text{number of mols of N,N'-bis-imide}}{\text{number of mols of diamine}}$$

is between 1.1 and 50, said imide prepolymer being present in an amount from 5% to 40% by weight of the polysulfone.

2. A composition according to claim 1 in which the polysulphone comprises essentially aromatic radicals.

3. A composition according to claim 2 in which the polysulphone contains —O—, —S—, and/or —CO— units.

4. A composition according to claim 2 in which the polysulphone consists of a plurality of units of the formula:

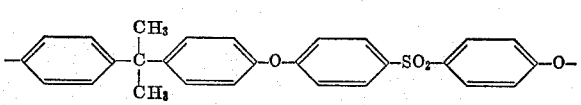

5. A composition according to claim 1 in which the polysulphone is derived from butadiene 1,5-cyclo octadiene or cis,trans-1,5-cyclodecadiene.

6. A composition according to claim 1 in which the ratio $$\frac{\text{number of mols of N,N'-bis-imide}}{\text{number of mols of diamine}}$$

is between 1.2 and 5.

7. A composition according to claim 1 in which the bis-imide is N,N'-4,4'-diphenylmethane-bis-maleimide.

8. A composition according to claim 1 in which the di-primary diamine is 4,4'-diamino-diphenylmethane.

9. A composition according to claim 1 in which the prepolymer is obtained by heating at 50° C. to 250° C.

10. A composition according to claim 1 in which the prepolymer is obtained in the presence of an acid catalyst.

11. A composition according to claim 10 in which the acid is maleic acid.

12. A composition according to claim 1 which also comprises a polar solvent.

13. A composition according to claim 12 in which the solvent is dichloroethane, dimethylformamide, N-methylpyrrolidone, dimethylacetamide or dimethylsulphoxide.

14. A process for preparing a composition as claimed in claim 1 which comprises intimately mixing the imide prepolymer and polysulphone.

15. A process according to claim 14 in which the mixing is effected in a polar solvent.

16. A film, filament, adhesive or laminate obtained from a composition as claimed in claim 1.

References Cited

UNITED STATES PATENTS

| | | | |
|---|---|---|---|
| 2,818,405 | 12/1957 | Kovacic | 260—78 |
| 3,562,223 | 2/1971 | Bargain | 260—78 |
| 3,658,764 | 4/1972 | Bargain | 260—78 |
| 3,679,639 | 7/1972 | Bargain | 260—78 |

PAUL LIEBERMAN, Primary Examiner

U.S. Cl. X.R.

260—30.8 DS, 32.4 R, 32.6 N, 33.8 R, 49, 78 TF, 78 UA, 823, 874, 887